(No Model.)

J. E. TREAT.
CASTER.

No. 412,308. Patented Oct. 8, 1889.

WITNESSES
Samuel E. Thomas
Th. B. O'Dogherty

INVENTOR
John E. Treat
By W. W. Leggett
Attorney

UNITED STATES PATENT OFFICE.

JOHN E. TREAT, OF ORION, MICHIGAN.

CASTER.

SPECIFICATION forming part of Letters Patent No. 412,308, dated October 8, 1889.

Application filed August 2, 1888. Serial No. 281,777. (No model.)

*To all whom it may concern:*

Be it known that I, JOHN E. TREAT, a citizen of the United States, residing at Orion, county of Oakland, State of Michigan, have invented a certain new and useful Improvement in Casters; and I declare the following to be a full, clear, and exact description of the same, such as will enable others skilled in the art to which it appertains to make and use the same, reference being had to the accompanying drawings, which form a part of this specification.

Figure 1:
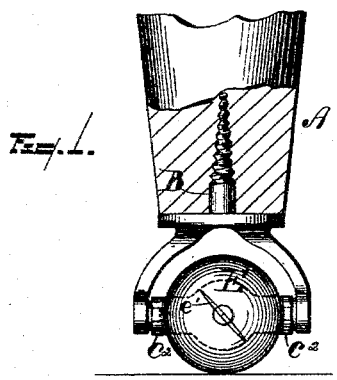
Figure 2:
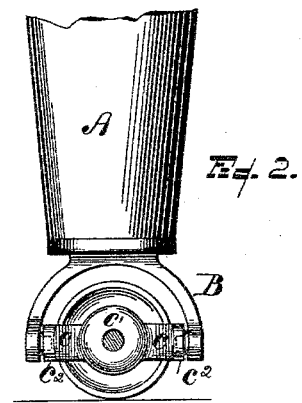
Figure 3:
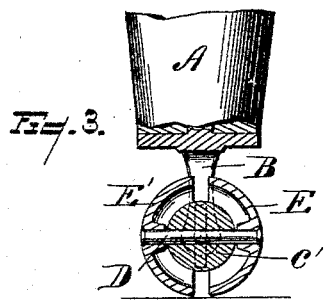
Figure 4:
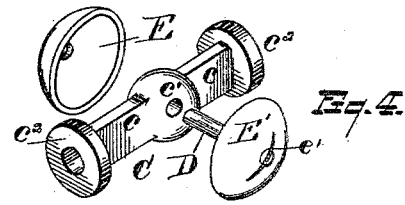
Figure 5:
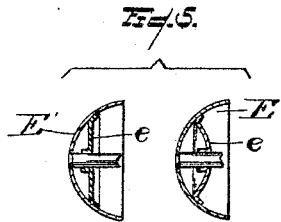
Figure 6:
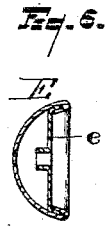
Figure 7:
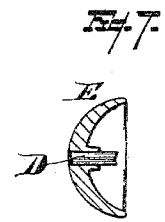

In the said drawings, Figure 1 is a view in elevation, showing parts in section, of a caster embodying my invention. Fig. 2 is a sectional view of the same; Fig. 3, a sectional view at right angles to that illustrated in Fig. 2. Fig. 4 is a separate view of the different parts constituting the ball and its two shafts. Figs. 5, 6, and 7 show different methods of constructing the balls.

It is the purpose of my invention to produce a ball-caster in such form that it may turn in all directions and always upon a shaft, the construction being such as to produce an efficient caster capable of sustaining the wear usually brought upon such a device.

In the drawings, A represents the leg of a piece of furniture—as, for instance, a chair or other device.

B is the shank of my caster. This shank may be of any desired form. Thus it may be in the form of a screw, as shown, adapted to enter a hole in the furniture, or it may be in the form of a cap, such as is common with caster-shanks, or in any other form.

To the shank B is journaled a shaft C, and through this at right angles is a shaft D. The latter is housed within and unites the two halves or spherical segments E and E' of the ball. The axes of these shafts intersect each other. The shaft C is preferably flattened at $c$, so as to permit the two semispherical segments to come quite closely together, while at the same time it is given suitable breadth in the direction of the plane of separation of the two segments. The shaft C is enlarged upon the interior of the ball at $c'$, so as to afford a long hub or bearing upon the shaft B of the ball. This long bearing prevents any tilting of the ball with respect to the shaft C and causes it to move with steadiness and without wabbling. It also prevents the spherical segments from rubbing against the portion $c$ of the shaft, and so not only prevents wear upon the shaft, but upon the edges of the segments as well, and greatly strengthens the shaft. The outer ends of the shaft C are enlarged at $c^2$, so that a large and substantial journal may project therefrom into the shank B of the caster, or large spuds from the shank may enter into the ends of the shaft without regard to the diminished thickness of the shaft at $c$. This engagement of the ends of the shaft C is effected by springing the ears or legs of the supporting-fork inward toward the ends of the shaft, thereby causing spuds upon one of the parts to enter corresponding spud-orifices in the other part.

The operation of the device will now be understood. The ball may roll freely upon the shaft D and may likewise rotate the shaft C. In this way, no matter in what direction the furniture may be pushed, the caster will rotate either about a single shaft or will rotate about both shafts simultaneously. The spherical segments E E' are hollowed upon the interior, so as to admit an elongated bearing $c'$ for the shaft C, the segments themselves being fastened together by the shaft D. The segments may be struck up from one or more pieces of sheet metal, as shown in Fig. 5, in which the parts $e$ are secured to the segments E E' by soldering; or, as shown in Fig. 6, the parts $e$ may be fastened in place by folding in over its edge the edge of the segment E or E'; or, again, it may be cast, as shown in Fig. 7.

It will be observed that the shaft D is journaled directly in the shaft C, and the shaft D may therefore be made of steel or other metal which will sustain a large amount of wear.

A caster of this character, it is apparent, will be easy in its action, since the ball turns about the shaft D close to the center of the ball, and turns with equal ease the shaft C within its journals.

I would have it understood that instead of journaling the shaft D through the shaft C it may be driven or otherwise seated firmly in the said shaft C, and the disks or semispheres E E' may in that event be journaled loosely, so as to revolve upon the said shafts.

In order to shift the ball off of the dead-center, should it happen to be in a position in which the plane dividing the two sections is horizontal, I purpose to provide the exterior of the segmental sections with one or more grooves e', the purpose being to deflect the ball and cause it to rotate the shaft C. This is effected by the carpet impinging against and within the said groove or grooves as the caster is drawn over the said carpet. These grooves may or may not be employed.

What I claim is—

1. A ball-caster composed of the segmental sections E E' and provided with one or more grooves e', substantially as and for the purposes described.

2. A caster consisting of two semi-spherical segments united rigidly by an axis, a plate with a thickened central portion at right angles to the said axis, said axis journaled through the plate, and large ends formed integral with the extremities of the plate beyond the peripheries of the segments, and in connection with said enlarged ends a forked support, said ends and forked supports adapted for engagement with each other by bending the ends of the fork toward the ends of the plate, thereby causing large spuds on one part to enter large spud-orifices in the other part, substantially as described, said plate being of less breadth than the diameter of the segments.

3. In a ball-caster, the combination, with the segments E E', each of said segments struck up from a single piece of metal, of the strengthening-pieces e, also struck up from pieces of metal and united with the inner faces of the segments E E', substantially as described.

In testimony whereof I sign this specification in the presence of two witnesses.

JOHN E. TREAT.

Witnesses:
M. B. O'DOGHERTY,
SAMUEL E. THOMAS.